June 26, 1934. E. G. BUSSE Re. 19,221

CAR TRUCK STRUCTURE

Original Filed May 5, 1927 2 Sheets-Sheet 1

INVENTOR
Edwin G. Busse.
BY Rodney Bedell
ATTORNEY

June 26, 1934. E. G. BUSSE Re. 19,221

CAR TRUCK STRUCTURE

Original Filed May 5, 1927 2 Sheets-Sheet 2

INVENTOR

Edwin G. Busse.

By Rodney Bedell
ATTORNEY

Reissued June 26, 1934

Re. 19,221

UNITED STATES PATENT OFFICE 19,221

CAR TRUCK STRUCTURE

Edwin G. Busse, Chicago, Ill., assignor to Chicago Railway Equipment Company, Chicago, Ill., a corporation of Illinois Original No. 1,650,931, dated November 29, 1927, Serial No. 188,942, May 5, 1927. Application for reissue April 15, 1933, Serial No. 666,342

27 Claims. (Cl. 188—210)

My invention relates to railway rolling stock and consists in an improved truck frame and brake beam mounting structure.

A comparatively recent development in cars has been the use of trucks without any bottom tie or spring planks, which parts have hitherto been used for mounting brake beam guides, safety guard, and third or fourth point supports. In the absence of the spring plank or corresponding member, some other manner of carrying the parts mentioned for cooperating with the brake beam is desired, and hitherto no successful apparatus has been provided so far as I am aware.

The object of my invention is to provide means on the side frame for carrying a suitable brake beam guide, safety guard, or support.

In the accompanying drawings which illustrate my invention,—

Figure 2:
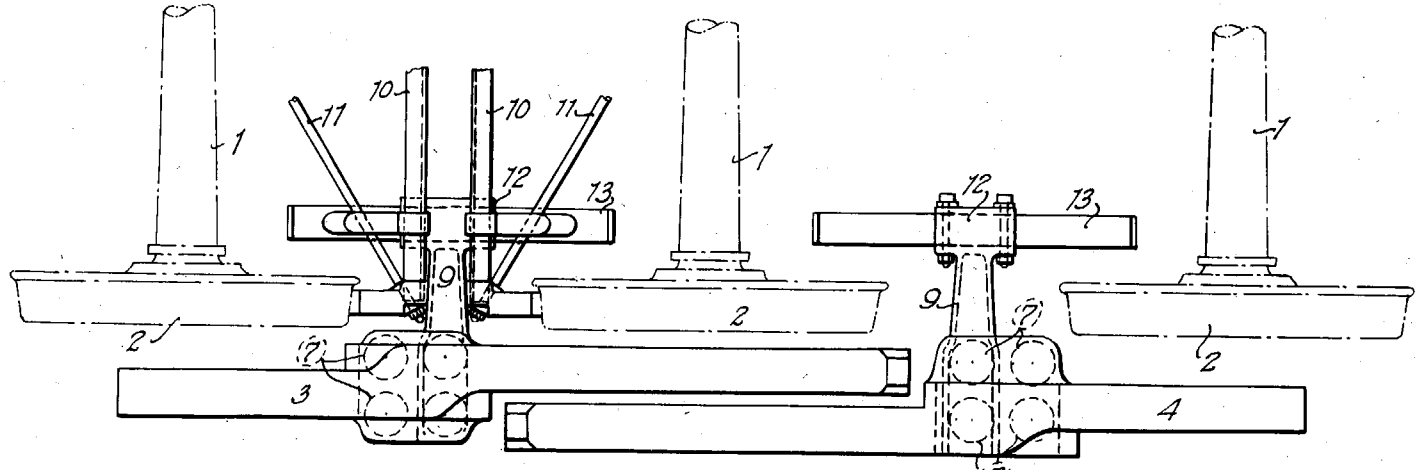
Figure 2 is a top view of one longitudinal half of the same truck.
Figure 1:
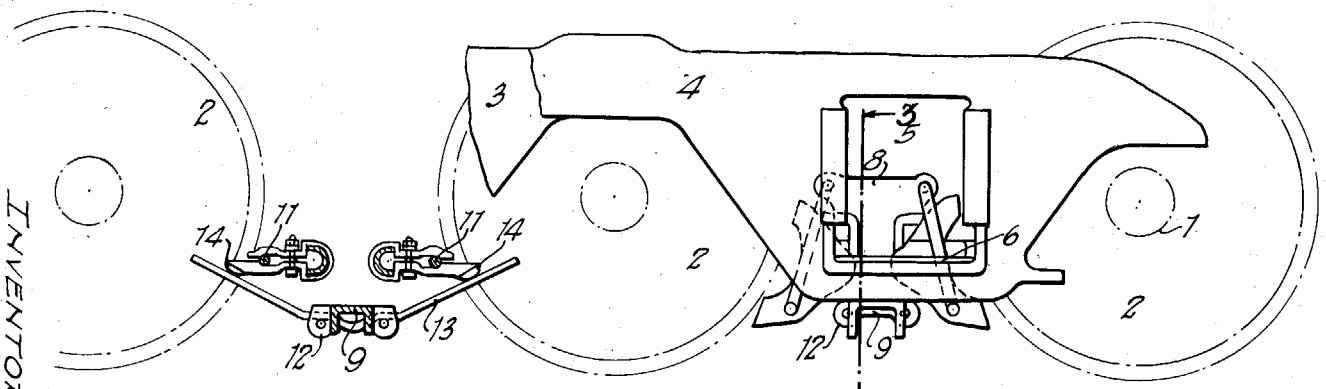
Figure 1 is in part a side elevation and in part a vertical longitudinal section through a six wheel car truck embodying my invention.
Figure 3:
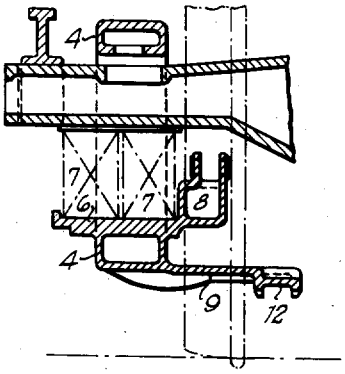
Figure 3 is a vertical transverse section through the side frame taken substantially on line 3—3 of Figure 1.

In the truck shown in Figures 1, 2 and 3, the usual axles and wheels are indicated at 1 and 2, respectively, and it will be understood that the axles are provided with journal boxes upon which the equalizing truck side frame elements 3 and 4 are mounted. The features of these elements aside from those illustrated form no part of my invention.

The side frames are provided with suitable recesses 5 and seats 6 for receiving and mounting the bolster supporting springs 7. Above and inside of each spring seat 6 is a bracket 8 to which the brake hanger may be pivoted in the usual manner.

Below the brake hanger bracket and extending inwardly from the side frame is an arm 9 which is adapted to extend under the level of the brake beams which are here shown as being of the truss type, each having a compression member 10 and a tension member 11. On the inner end of arm 9 are transversely and downwardly extending elements which form a bracket 12 adapted to carry a member 13 which extends longitudinally of the truck and forms a fourth point support or guide for the brake beams. This means may also serve as a safety guard to prevent movement of the brake beam downwardly of the truck.

In Figures 1 and 2, I show the brake beams as being equipped with fourth point supports 14 resting upon member 13.

In the preferred embodiment of my invention illustrated in Figures 1, 2 and 3, the side frame, spring seat, brake hanger bracket, and brake beam support arm are formed integrally, and it is believed that such embodiment of my invention is the most economical and will possess adequate strength with the minimum amount of material and also will eliminate the expense of assembling separate parts and the necessity of inspecting and maintaining a separate part structure.

Figure 4:
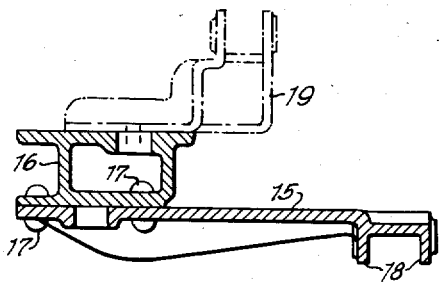
Figure 4 is a section similar to Figure 3 but illustrating a modified form of my invention in which the arm for supporting the brake beam elements is made separately and applied to the side frame.
Figure 5:
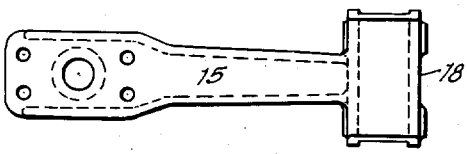
Figure 5 is a top view of the arm shown in Figure 4.
Figure 6:
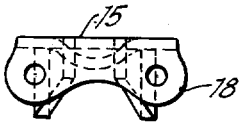
Figure 6 is an end view of the same.

My invention may be embodied in separate parts, however, and in Figures 4, 5 and 6 I illustrate a support arm 15 which is formed independently of the side frame, spring seat, and brake hanger bracket and is adapted to be attached to a longitudinal web of the truck side frame 16 by rivets 17 spaced transversely of the web. The inner end of the arm is provided with integral bracket elements 18 corresponding to those provided on the structure shown in Figures 1, 2 and 3. It will be understood that these bracket elements could also be formed separately from the arm and riveted, bolted, or welded thereto. In this form of my invention, the hanger bracket is indicated at 19, but it will be understood that this may be used or not and forms no part of the support arm 15.

Figure 7:
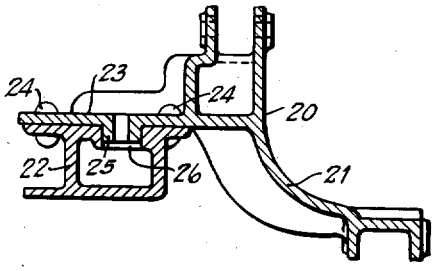
Figure 7 illustrates another modification of my invention.

In the modification illustrated in Figure 7 the hanger and bracket 20 and the brake beam support arm 21 are formed integrally with each other but separatley from the side frame 22 and the laterally projecting flange 23 on the brake bracket and support arm casting is secured to a horizontal web of the side frame by rivets 24 spaced transversely of the web and may form the seat for the bolster springs. In this structure, I have shown a boss 25 on the lower side of flange 23 and have provided a corresponding recess 26 in the side frame to receive the boss and assist the rivets 24 in retaining the bracket arm casting in position.

In each of the last two forms described, the brake beam guard, guide, or support arm is stably positioned by supporting and securing elements substantially spaced transversely of the side frame.

Obviously other modifications in the details of my invention and in its application to the side frame of the truck may be made without departing from the spirit of my invention, and I contemplate the exclusive use of all such variations as come within the scope of my claims.

I claim:

1. A car truck side frame having an arm supported exclusively thereby and extending inwardly therefrom for carrying a brake beam engaging element below the brake beam.

2. A car truck side frame provided with an arm supported exclusively thereby and projecting inwardly therefrom below the level of the brake beams and adapted to carry a supplemental guard or guide or support for a brake beam.

3. In a car truck, a side frame, a brake beam, and structure carried exclusively by said frame and extending transversely of the truck beneath the level of said beam to guard, guide, or support the latter, said structure terminating adjacent to its beam engageable portion.

4. In a car truck, a side frame, an inwardly extending arm on said frame, and a brake beam engaging member on said arm extending longitudinally of the truck beneath the level of the brake beam.

5. In a car truck, a side frame, an inwardly extending arm on said frame, and a brake beam guard, guide, or support member detachably mounted on said arm and extending longitudinally of the truck.

6. In a car truck, a side frame, an inwardly extending arm on said frame, and a brake beam guide, guard, or support on said arm and extending longitudinally of the truck on both sides of said arm.

7. In a car truck, a side frame, an inwardly extending arm on said frame, a brake beam guide or guard or support on said arm and extending longitudinally of the truck, and a plurality of brake beams above said arm and adapted to be supported thereby.

8. A car truck side frame having a bolster spring seat and brake beam guard, guide, or fourth point support structure including a part formed integrally with said spring seat.

9. A car truck side frame having a bolster spring seat, a brake beam hanger bracket, and a brake beam guard, guide, or fourth point support bracket, all formed integrally with each other.

10. In a railway truck, a side frame having an integral brake beam hanger bracket, and structure for supporting, guarding, or guiding a brake beam, said structure having a part formed integrally with said bracket and supported exclusively from said side frame.

11. In a railway truck, a one-piece casting comprising a truck side frame with an integral brake beam hanger bracket and an integral bracket for carrying a brake beam guard, guide, or support and supported exclusively from said side frame.

12. In a car truck, a side frame, a brake hanger bracket thereon, an arm extending inwardly from and supported exclusively by the lower portion of said side frame, and a brake beam support bracket on the inner end of said arm.

13. In a car truck, a side frame, an arm extending inwardly from the lower portion of said side frame, and depending elements on said arm extending transversely thereof and forming a bracket for carrying a brake beam guard, support or guide arm.

14. In a car truck, a side frame, and a member carried solely by a portion of said side frame below the normal brake beam level and adapted to guard, guide, or support a brake beam independently of the brake hanger.

15. A car truck device comprising elements for extending inwardly from a side frame to mount a brake beam hanger, and elements extending downwardly and inwardly from said first-mentioned elements to form a supplemental member for engaging a brake beam.

16. A car truck device comprising elements for forming a spring seat, elements extending inwardly and upwardly from said spring seat to form a brake hanger bracket, and elements extending downwardly and inwardly from said bracket to form a supplemental member for engaging a brake beam.

17. A railway truck side frame having a bolster spring seating part and a projecting part forming a brake beam auxiliary guard, guide or support independently of said seating part.

18. A railway truck side frame including a bolster spring seating element, and a brake beam auxiliary guard, guide or support member projecting inwardly from a point on said frame spaced from said spring seating element.

19. In a railway truck side frame, a spring seating element terminating adjacent to the plane of the inner face of the side frame, and brackets for a brake beam hanger and an auxiliary brake beam guard, guide, or support member projecting inwardly from said side frame substantially beyond said spring seating element.

20. In a railway spring-plankless truck, a side frame, and brake beam auxiliary guard, guide or support structure secured to said frame and projecting laterally therefrom, said structure being rigidly and solely supported by elements on said side frame substantially spaced apart transversely thereof.

21. In a railway spring-plankless truck, a side frame having a box section lower part, and a bracket for a brake beam auxiliary guard, guide or support member projecting from and carried by a wall of said part.

22. In a railway spring plankless truck, a side frame member including spaced apart horizontal webs and interconnecting structure, and a member mounted solely on one of said webs and extending transversely of the same inwardly of the side frame to underlie and guard, guide or support a brake beam.

23. In a railway truck, wheels and axles, side frames carried on opposite ends of said axles, brake beams intermediate said axles and terminating short of said side frames, the truck being free of frame structure between said side frames at points intermediate said axles, and structure projecting inwardly from said side frames and solely supported thereby below the outer portions of said brake beams to guard, guide, or support the latter.

24. In a railway truck, a side frame including a portion forming a spring seat, and an arm carried by said side frame below the level of said seat and projecting inwardly therefrom and arranged to guard, guide, or support a brake beam.

25. A car truck device consisting of an arm having one end arranged to carry a brake beam guard, guide or support member below the level of the brake beam and having a portion arranged for application to a truck side frame to provide the sole support of the device.

26. A car truck device consisting of an arm having one end arranged to carry a brake beam guard, guide or support member below the level of the brake beam and being arranged spaced longitudinally of its length for rigid attachment to points on a truck side frame, spaced transversely of the latter, to provide the sole support of the device.

27. A car truck device consisting of an arm having one end arranged to carry a brake beam guard, guide or support member below the level of the brake beam and having a flat portion arranged for application to the substantially horizontal face of a portion of a truck side frame to provide the sole support of the device.

EDWIN G. BUSSE.